United States Patent Office 2,719,841
Patented Oct. 4, 1955

2,719,841

AZOBIPHENYLCARBONYLAMINOANTHRA-QUINONE COMPOUNDS

Joseph Deinet, Glassboro, N. J., assignor to E. I. du Pont de Nemours and Company, Wilmington, Del., a corporation of Delaware No Drawing. Application July 9, 1951,
Serial No. 235,892

6 Claims. (Cl. 260—207.1)

This invention relates to new products which are azobiphenylcarbonylaminanthraquinone monosulfonic acid compounds of the general formula:

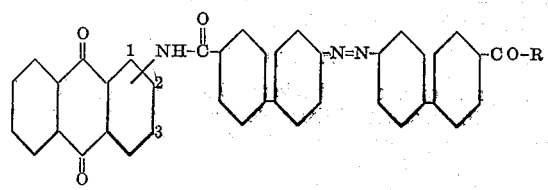

in which the —NHCO— linkage is attached to the anthraquinone nucleus in one of the positions 1 and 2 and the remaining position 1 and 2 carries one of the elements of the group consisting of —H, —Cl and —Br; the 3-position carries a member of the group consisting of —H, —Cl, —Br and —SO₃M; R stands for a substituent of the group consisting of —Cl, —OH, —NH₂, —NH-C₆H₅ and —O-alkyl in which the alkyl chain contains from 1 to 18 carbon atoms, there being one —SO₃M group attached to the anthraquinone nucleus in a beta position; and M in each case stands for substituent of the group consisting of —H, —NH₄ and an alkali metal. These compounds being of high molecular weight, are water insoluble.

In U. S. Patent 2,559,667 a series of azobiphenylcarbonylaminoanthraquinone compounds is disclosed which are useful for the preparation of dyes of the anthraquinone oxazole and thiazole series containing the azobiphenyl nucleus. These dyes have been found to exhibit good tinctorial strength, brightness and fastness properties when applied to textile fibers by the usual vat dyeing processes. When applied by printing processes, however, they did not exhibit the same strong, bright shades as when applied by the usual dyeing processes.

It is an object of the present invention to produce new compounds which are useful as anthraquinone vat dyes but which are of particular value as intermediates for the preparation of other new anthraquinone vat dyes exhibiting good tinctorial strength, brightness and fastness properties when applied to textile fibers by either dyeing or printing processes normally employed in the application of vat dyes. It is a further object of the invention to produce new and valuable compounds which are particularly useful as intermediates in the preparation of vat dyes from readily available aminoanthraquinone sulfonic acids and from halogen aminoanthraquinone sulfonic acids so that the resulting compounds carry in one of the beta positions of the anthraquinone nucleus a sulfonic acid group either in the form of the free acid or its ammonium or alkali metal salts.

The compounds of this invention are best prepared in a non-reactive medium by condensing an aminoanthraquinone beta-sulfonic acid or a halogen aminoanthraquinone sulfonic acid with 4,4'-azobiphenyl-4'',4'''-dicarboxylic acid chloride in substantially equal molecular quantities and at temperatures in the range of from 120° to 210° C., and the resulting products are isolated by filtration and recovered in substantially quantitative yields. In this reaction the condensation of the aminoanthraquinone compound appears to take place substantially quantitatively on only one end of the dicarbonyl chloride, for by analysis the resulting product appears to be uniform in its composition and substantially pure.

While some of the compounds of this invention in themselves are useful as vat dyes, they are particularly useful as intermediates for preparation of oxazole and thiazole dyes as more particularly described in co-pending applications Serial No. 235,893, Serial No. 235,894, Serial No. 235,891 and Serial No. 235,895, filed of even date herewith.

The following examples are given to illustrate this invention. The parts used are by weight.

Example 1

580 parts of nitrobenzene, 1 part of pyridine, 35.5 parts of 2-aminoanthraquinone-3-sulfonic acid sodium salt (fine powder) and 50 parts of 4,4'-azobiphenyl-4'',4'''-dicarboxylic acid chloride are heated together while agitating to 168° to 170° C. and maintained at this temperature for four hours. The mass is then cooled to 25° C., and filtered. The filter cake is washed with benzene and dried. It forms a pale yellow powder. In the form of the free acid it has the following formula:

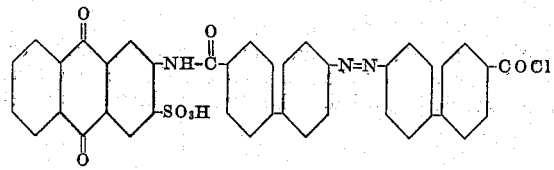

Example 2

500 parts of nitrobenzene, 1 part of pyridine, 20.2 parts of 1-bromo-2-aminoanthraquinone-3-sulfonic acid (sodium salt) and 23 parts of 4,4'-azobiphenyl-4'',4'''-dicarboxylic acid chloride are slowly heated together to 155° to 160° C. and maintained at this temperature for three hours. After cooling to 25° C., 20 parts of methyl alcohol are added. The reaction mass is then heated to 120° to 125° C. and maintained for six hours. It is then cooled to 25° C., filtered, the filter cake washed with alcohol and water in turn, and dried. The final product is a yellow powder and dyes cotton from a sodium hydrosulfite vat in yellow shades.

The product in the form of the free acid has the following formula:

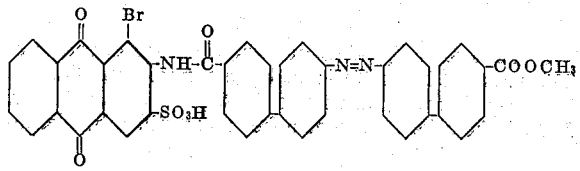

Example 3

500 parts of nitrobenzene, 1 part of pyridine, 20.2 parts of 1-bromo-2-aminoanthraquinone-3-sulfonic acid (sodium salt) and 23 parts of 4,4'-azobiphenyl-4'',4'''-dicarboxylic acid chloride are heated together while agitating to from 160° to 162° C. and maintained at this temperature for three hours. The mass is then cooled to 25° C., filtered, the cake washed with benzene and dried. It forms a light yellow powder. In the form of the free acid it has the following formula:

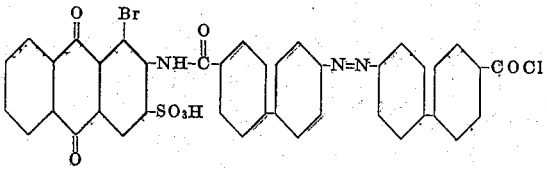

Example 4

500 parts of nitrobenzene, 1 part of pyridine, 20.2 parts of 1-bromo-2-aminoanthraquinone-3-sulfonic acid (sodium salt) and 23 parts of 4,4'-azobiphenyl-4'',4'''-dicarboxylic acid chloride are heated together while agitating to 160° C. and maintained at this temperature for three hours. The mass is then cooled to from 98° to 100° C. and a slow stream of ammonia is passed into the reaction mass under good agitation for one and one-half hours. Then the mass is cooled to 25° C., filtered and the cake washed with alcohol and dried. The product obtained is a yellow powder (brown cast) easily vattable with sodium hydrosulfite and alkali in water, from which cotton or related fiber is dyed in yellow shades. The product in the form of the ammonium salt has the following formula:

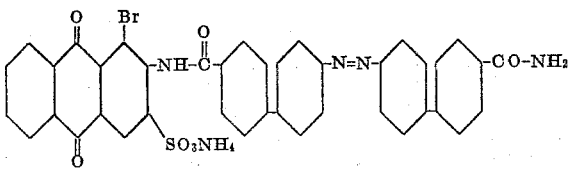

Example 5

500 parts of nitrobenzene, 1 part of pyridine, 18.5 parts of 1-chloro-2-aminoanthraquinone-3-sulfonic acid (sodium salt) and 23 parts of 4,4'-azobiphenyl-4'',4'''-dicarboxylic acid chloride are heated together to from 160° to 162° C. and maintained for four hours. The mass is then cooled to 25° C., filtered and the cake washed with benzene and dried. The product obtained is a yellow powder. In the form of the free acid it has the following formula:

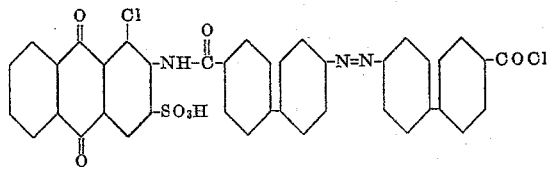

Example 6

25 parts of the product of Example 5 are dissolved in 250 parts of 93% sulfuric acid at a temperature of 5° C. The mass is then poured into 2500 parts of cold water, filtered, the cake washed acid-free and purified by bleaching with alkaline sodium hypochlorite. It forms a bright yellow paste and dyes cotton from an alkali sodium hydrosulfite vat in yellow shades. The product in the form of the sodium salt has the following formula:

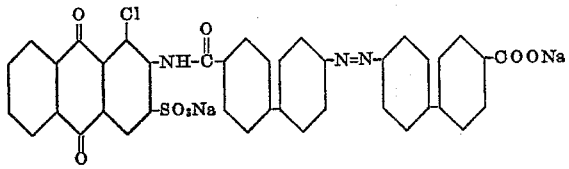

Example 7

400 parts of nitrobenzene, 1 part of pyridine, 21.3 parts of mixed 1-aminoanthraquinone-6- and 7-sulfonic acids (sodium salt) and 30 parts of 4,4'-azobiphenyl-4'',4'''-dicarboxylic acid chloride are heated together, while agitating, to from 172° to 175° C. and maintained at this temperature for three hours. The mass is then cooled to 25° C., filtered, and the filter cake washed with benzene and dried. The product in the form of the free acid has the following formula:

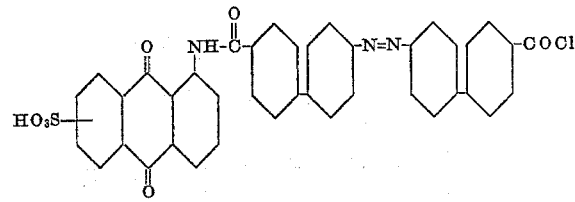

where —SO₃H is attached to either the 6- or 7-position of the antrhquinone nucleus.

Example 8

250 parts of trichlorobenzene, 0.5 part of pyridine, 25 parts of the product of Example 7 and 10 parts of aniline are heated together to from 205° to 208° C. and maintained at this temperature for one hour. The mass is then cooled to 50° C., filtered and the filter cake washed with benzene, alcohol and hot water, in turn, and dried. The product forms a dark yellow powder and dyes cotton from an alkali hydrosulfite vat in yellow shades. In the form of the free acid, it has the following formula:

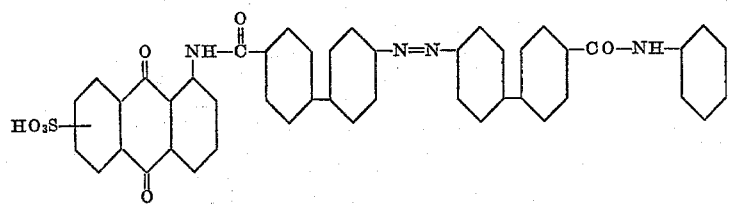

Example 9

1000 parts of nitrobenzene, 2 parts of pyridine, 42.2 parts of 4,4'-azobiphenyl-4'',4'''-dicarboxylic acid and 40 parts of thionyl chloride are heated together to from 98° to 100° C. and maintained at this temperature for fifteen hours. The mass is then air-blown for one hour to remove excess of thionyl chloride. After cooling to 50° C., 40.4 parts of 2-amino-3-bromoanthraquinone-6-sulfonic acid (sodium salt) fine powder are added. The reaction mass is then heated to 200° C. and maintained at this temperature for one hour. The mass is then cooled to 25° C., filtered, washed with benzene and dried. It forms a pale yellow powder. In the form of the free acid it has the following formula:

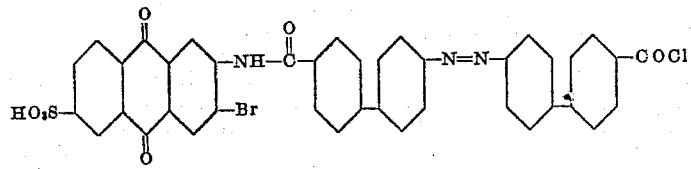

Example 10

1000 parts of nitrobenzene, 2 parts of pyridine, 42.4 parts of 4,4'-azobiphenyl-4'',4'''-dicarboxylic acid and 40 parts of thionyl chloride are heated together to 100° C. 98° to 100° C. and maintained at this temperature for fifteen hours. The mass is then air-blown for one hour to remove excess of thionly chloride. After cooling to 50° C., 32.5 parts of 2-aminoanthraquinone-6-sulfonic acid sodium salt (fine powder) are added. The reaction mass is then heated to 200° C. and maintained at this temperature for one hour. After cooling to 50° C., 30 parts of methyl alcohol are added. The reaction mass is then heated to from 120° to 125° C. and maintained for six hours. It is then cooled to 25° C. and filtered. The filter cake is washed with alcohol and water, in turn, and dried. The final product is a yellow powder and dyes cotton from a sodium hydrosulfite vat in weak yellow shades.

The product in the form of the free acid has the following formula:

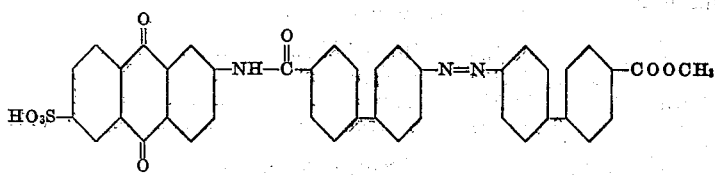

Example 11

1000 parts of nitrobenzene, 2 parts of pyridine, 42.2 parts of 4.4'-azobiphenyl-4",4'''-dicarboxylic acid and 40 parts of thionly chloride are heated together to 100° C. and maintained for fifteen hours. The mass is then air-blown for one hour. After cooling to 50° C., 48.3 parts of 1,3-dibromo-2-aminoanthraquinone-6-sulfonic acid (Na salt) fine powder are added. The reaction mass is then heated to 200° C. and maintained for one and one-half hours. The mass is then cooled to 50° C., filtered and the filter cake washed with carbon tetrachloride and dried.

The final product is a pale yellow powder. In the form of the free acid it has the following formula:

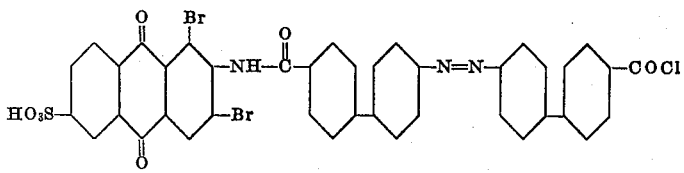

While in the specific examples above given sulfonic acid groups are in general illustrated as the free sulfonic acids, it will be obvious that they may be converted to the ammonium and alkali metal salts in the usual manner. In the application of these compounds to textile fibers by the usual vatting procedure involving the use of caustic alkali and alkaline hydrosulfite, they will of course be converted to the alkali metal salts.

The compounds of this invention containing the free acid chloride group may be converted to the free carboxylic acid by the usual acid pasting procedure such as by dissolving the acid chloride compounds in concentrated sulfuric acid at from 5° to 10° C. and drowning. The compounds containing the free carboxylic acid group may be vatted with the usual alkaline hydrosulfite vat, but because of their relatively low tinctorial value as compared with other compounds of this series, they are not of outstanding value as vat dyestuffs in themselves.

While, as illustrated in the examples, the condensation of the aminoanthraquinone sulfonic acid compound with the azobiphenyldicarboxylic acid chloride is preferably carried out in the presence of pyridine, other organic compounds such as quinoline, dimethyl aniline, etc., may be used in place of the pyridine, or the pyridine may be omitted entirely from the reaction.

Any inert organic solvents having suitable boiling points may be used as the medium in which the reaction is carried out, such as nitrobenzene, halogenated nitrobenzenes, nitrotoluenes, napthalene, the chlorobenzenes, etc. In the preparation of the esters, as more particularly illustrated in Example 2, any of the alcohols containing from 1 to 18 carbon atoms, such as ethyl, butyl, hexyl, octyl, dodecyl, etc., may be employed.

I claim:

1. The water insoluble azobiphenylcarbonylaminoanthraquinone sulfonic acid compounds of the formula:

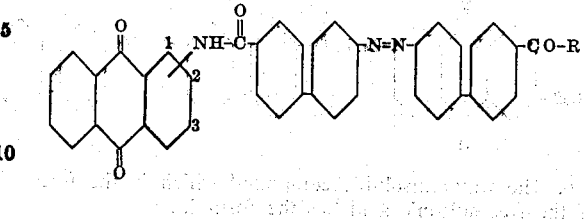

in which the —NHCO— linkage is attached to the anthraquinone nucleus in one of the positions 1 and 2 and the remaining position 1 and 2 carries one of the elements of the group consisting of —H, —Cl and —Br; the 3-position carries a member of the group consisting of —H, —Cl, —Br and —SO₃M; R stands for a substituent of the group consisting of —CL, —OH, —NH₂, —NH-C₆H₅ and —O-alkyl in which the alkyl chain contains from 1 to 18 carbon atoms; there being one —SO³M group attached to the anthraquinone nucleus in a beta position; and M in each case stands for a substituent of the group consisting of —H, —NH₄ and an alkali metal.

2. The water insoluble compound which in the form of the sodium salt has the formula:

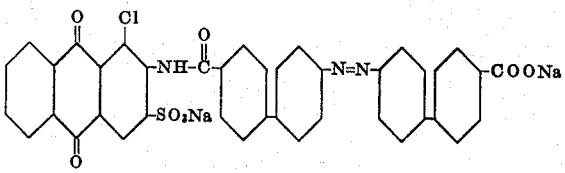

3. The water insoluble compound which in the form of the free sulfonic acid has the formula:

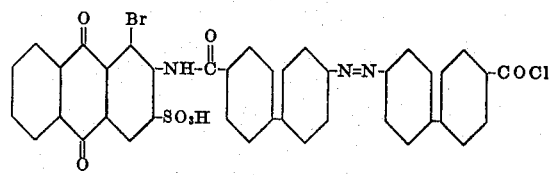

4. The water insoluble compound which in the form of the free sulfonic acid has the formula:

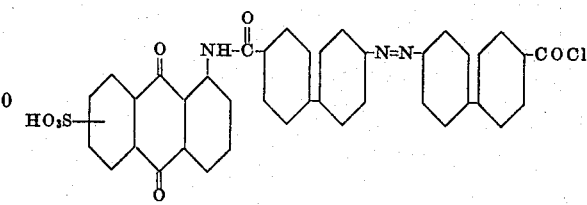

where the —SO₃H is in the positions 6 and 7.

5. The water insoluble compound which in the form of the free sulfonic acid has the formula:
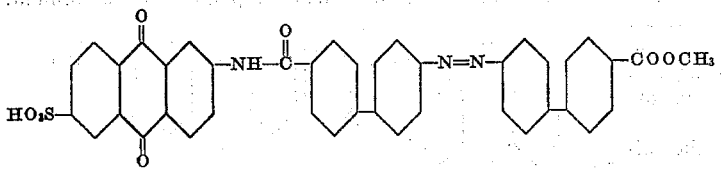
6. The water insoluble compound which in the form of the free sulfonic acid has the formula:
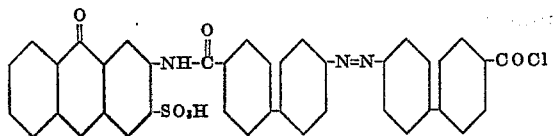
References Cited in the file of this patent
UNITED STATES PATENTS
| | | |
|---|---|---|
| 2,108,126 | Honold et al. | Feb. 15, 1938 |
| 2,145,954 | Semple et al. | Feb. 7, 1939 |
| 2,395,229 | Lowe et al. | Feb. 19, 1946 |
| 2,559,667 | Schroeder et al. | July 10, 1951 |
FOREIGN PATENTS
| | | |
|---|---|---|
| 243,337 | Switzerland | Dec. 16, 1946 |
| 252,301 | Switzerland | Oct. 1, 1948 |